US010569655B2

(12) United States Patent
David

(10) Patent No.: US 10,569,655 B2
(45) Date of Patent: Feb. 25, 2020

(54) ELECTRICAL MOTOR SCOOTER

(71) Applicant: UJET VEHICLES S.À.R.L., Bertrange (LU)

(72) Inventor: Patrick David, Blaustein (DE)

(73) Assignee: Ujet S.A., Leudelange (LU)

(*) Notice: Subject to any disclaimer, the term of this patent is extended or adjusted under 35 U.S.C. 154(b) by 160 days.

(21) Appl. No.: 15/564,827

(22) PCT Filed: Apr. 6, 2016

(86) PCT No.: PCT/EP2016/057491
§ 371 (c)(1),
(2) Date: Oct. 6, 2017

(87) PCT Pub. No.: WO2016/162367
PCT Pub. Date: Oct. 13, 2016

(65) Prior Publication Data
US 2018/0111488 A1 Apr. 26, 2018

(30) Foreign Application Priority Data

Apr. 8, 2015 (DE) .................. 10 2015 105 331

(51) Int. Cl.
B60L 7/18 (2006.01)
B60W 50/08 (2012.01)
(Continued)

(52) U.S. Cl.
CPC .................. B60L 7/18 (2013.01); B60L 7/26 (2013.01); B60W 50/082 (2013.01);
(Continued)

(58) Field of Classification Search
CPC .......... B60L 7/18; B60L 7/26; B60L 2200/12; B60W 50/082; Y02T 10/7258; Y02T 10/76
See application file for complete search history.

(56) References Cited

U.S. PATENT DOCUMENTS 6,491,122 B2 12/2002 Leitner et al.
2006/0012144 A1 1/2006 Kunzler et al.
(Continued)

FOREIGN PATENT DOCUMENTS

DE 689 03 106 T2 3/1993
DE 10 2006 008 064 A1 8/2006
(Continued)

OTHER PUBLICATIONS

International Search Report Written Opinion for International Application No. PCT/EP2016/057473 dated Jul. 12, 2016.
(Continued)

Primary Examiner — Michael D Lang
(74) Attorney, Agent, or Firm — Wolf, Greenfield & Sacks, P.C.

(57) ABSTRACT

Electric motor scooters are disclosed. In one embodiment, an electric motor scooter includes an electric drive, an electric battery, an actuation unit, and a control unit. The actuation unit may be brought in to one of a plurality of positions along an actuation distance, and the control unit is configured to selective a drive mode depending on the position of the actuation unit along the actuation distance. The drive modes include a recuperation mode, a coasting mode, an acceleration mode, and a boost mode. When in the recuperation mode, at least a portion of the energy generated in the electric drive may be delivered to the battery.

13 Claims, 4 Drawing Sheets

(51) Int. Cl.
    *B60L 7/26*     (2006.01)
    *B60W 30/18*     (2012.01)
    *B60W 50/14*     (2012.01)
    *B62J 99/00*     (2009.01)

(52) U.S. Cl.
    CPC ............... *B60W 30/18127* (2013.01); *B60W 2030/1809* (2013.01); *B60W 2050/146* (2013.01); *B60W 2300/365* (2013.01); *B60W 2540/10* (2013.01); *B60Y 2200/126* (2013.01); *B62J 2099/0026* (2013.01); *B62K 2202/00* (2013.01); *B62K 2204/00* (2013.01)

(56) References Cited

U.S. PATENT DOCUMENTS

| | | |
|---|---|---|
| 2007/0209855 A1 | 9/2007 | Burkiewicz |
| 2012/0111137 A1* | 5/2012 | Bliss ............... B60K 26/02 74/504 |
| 2012/0138375 A1 | 6/2012 | Hughes |
| 2012/0175179 A1 | 7/2012 | Spector et al. |
| 2013/0338875 A1 | 12/2013 | Weiss et al. |
| 2015/0191124 A1* | 7/2015 | Du ............... F16M 13/022 248/205.4 |
| 2018/0118298 A1 | 5/2018 | David et al. |
| 2018/0151860 A1 | 5/2018 | David et al. |

FOREIGN PATENT DOCUMENTS

| | | |
|---|---|---|
| DE | 10 2007 054 258 A1 | 5/2009 |
| DE | 10 2010 027 997 A1 | 3/2011 |
| DE | 102010063358 A1 | 6/2012 |
| DE | 11 2010 002 563 T5 | 9/2012 |
| DE | 10 2011 111 537 A1 | 2/2013 |
| DE | 10 2011 113 226 A1 | 3/2013 |
| DE | 10 2011 117 388 A1 | 5/2013 |
| DE | 102011117388 A1 | 5/2013 |
| DE | 102013205120 A1 | 9/2013 |
| EP | 1 118 477 A2 | 7/2001 |
| EP | 1 857 314 A2 | 11/2007 |
| EP | 2 280 436 A2 | 2/2011 |
| EP | 2 546 496 A1 | 1/2013 |
| EP | 2711276 A1 | 3/2014 |
| EP | 2 853 435 A2 | 4/2015 |
| JP | S61-5283 U | 6/1982 |
| JP | H08-111905 A | 4/1996 |
| JP | H08-273648 A | 10/1996 |
| JP | H09-98509 A | 4/1997 |
| JP | H10-169425 A | 6/1998 |
| JP | 2003-333835 A | 11/2003 |
| JP | 2010-88154 A | 4/2010 |
| JP | 2013-546297 A | 12/2013 |
| JP | 2014-61856 A | 4/2014 |
| RU | 2245267 C2 | 1/2005 |
| WO | WO 90/00477 A1 | 1/1990 |
| WO | WO 2009/144525 A1 | 12/2009 |
| WO | WO 2012/079810 A2 | 6/2012 |
| WO | WO 2012/093367 A1 | 7/2012 |
| WO | WO 2016/139510 A1 | 9/2016 |
| WO | WO 2016/162354 A1 | 10/2016 |
| WO | WO 2016/162367 A1 | 10/2016 |
| WO | WO 2016/162370 A1 | 10/2016 |

OTHER PUBLICATIONS

International Search Report andWritten Opinion for International Application No. PCT/EP2016/057491 dated Aug. 8, 2016.
International Search Report and Written Opinion for International Application No. PCT/EP2016/057500 dated Jul. 12, 2016.
Translation of International Preliminary Report on Patentability for International Application No. PCT/EP2016/057473 dated Oct. 19, 2017.
Translation of International Preliminary Report on Patentability for International Application No. PCT/EP2016/057491 dated Oct. 19, 2017.
Translation of International Preliminary Report on Patentability for International Application No. PCT/EP2016/057500 dated Oct. 19, 2017.

* cited by examiner

ELECTRICAL MOTOR SCOOTER

This application is a national stage filing under 35 U.S.C. § 371 of International Application No. PCT/EP2016/057491, filed on Apr. 6, 2016, which claims priority to German Application No. 10 2015 105 331.4, filed on Apr. 8, 2015. Each of these applications is incorporated herein by reference in its entirety.

The present disclosure is related to an electric motor scooter.

Motor scooters fitted with electric drives are known. Simply by way of example reference is made to EP 1 857 314 A2. Electric motor scooters or motorised two-wheelers usually have a body and two wheels, one of the wheels being driven by means of an electric drive which is fed by a battery.

Efficient use of the energy stored in an electric battery, along with travel comfort, which is related to the dynamic performance of the vehicle, is a major challenge. The range of an electric motor scooter is determined primarily by how efficiently the available energy can be used. Furthermore, for a battery to be charged, substantially more time is needed than for filling up motor scooters driven by an internal combustion engine. Therefore, where possible, an electric motor scooter should have to be recharged as seldom as possible.

Furthermore, the safe use of an electric motor scooter is dependent on its drivability.

Unintended sudden braking of an electric motor scooter should therefore be avoided.

In view of the foregoing, according to some aspects, an electric motor scooter is provided that uses the energy stored in the battery as efficiently as possible. In some embodiments, this may be accomplished by means of an electric motor scooter according to claim 1. For example, an electric motor scooter may include:
- at least an electric drive;
- at least an electric battery;
- at least an actuation unit, which is designed so that the actuation unit can be brought into different positions along the total distance of actuation;
- a control unit, which is designed
  - to determine the position of the actuation unit;
  - depending on the position thus determined, to select a driving mode from a number of driving modes and to set the selected driving mode, the driving modes comprising:
    - a) a recuperation mode;
    - b) a coasting mode;
    - c) an acceleration mode,
  - wherein, when the recuperation mode is set, the control unit controls the electric drive so that energy generated in the electric drive is delivered, at least partially, to the battery.

According to some aspects, a recuperation mode may be selected by means of an actuation unit, in particular a thumb lever, and through the recuperation mode, kinetic energy can be converted into electric energy so that this energy can be stored in the battery. Accordingly, the relevant driving mode can be explicitly requested by the driver, so that no unintended braking of the vehicle takes place.

In one embodiment, in addition to the recuperation mode, a coasting mode and an acceleration mode can be selected by means of the actuation unit. The coasting mode can be defined such that, in the coasting mode, no torque or only very low torque is applied by the electric drive. The acceleration mode can be defined such that, in contrast to the recuperation mode, the acceleration mode provides a positive torque, applied by the electric drive.

By providing a recuperation mode, it is therefore possible to recover the energy normally lost to thermal energy during braking as electrical energy.

In one embodiment, the control unit controls the acceleration mode in such a way that an essentially linear dependence exists between a position of the actuation unit and the torque applied by the electric drive. The position can be given using a distance value from a starting position to the current position. The position can also be given by an actuation unit, which can be moved essentially circularly around a centre, by means of an angle relative to a starting position. In some embodiments, a linear relationship exists between the position and the torque that is applied. This liner relationship can, for example, be given or approximated by the following formula:

$$M(P)=k1*P+d,$$

where $M(P)$ is the torque of position p, $k1$ is a first acceleration coefficient, P is the position, in degrees for example, and d is a constant. The linear relationship has the advantage that the speed can be adjusted very precisely. In addition, a comfortable driving feel arises when acceleration takes place in an appropriate manner.

The driving modes can comprise a boost mode. The control unit may control the drive and/or the battery in the boost mode in such a way that, at least partially, there is an essentially linear dependence between a position of the actuation unit and the torque applied by the electric drive. This linear dependence may be given by a second acceleration coefficient, this second acceleration coefficient being greater than the first acceleration coefficient already mentioned. In other words, faster acceleration (more torque) may be applied in the boost mode compared to the "normal" acceleration mode.

The relationship between torque and position can be expressed by means of the following formula:

$$M(P)=k2*P+d2,$$

where $k2$ is the second acceleration coefficient and d2 is a second constant.

The first acceleration coefficient may be smaller than the second acceleration coefficient (e.g., $k1<k2$ or $k1<<k2$). For example, the first acceleration coefficient can be at least 10, 20, 30, 40 or 50 percent smaller. According to some embodiments, the second acceleration coefficient can be twice as big as the first acceleration coefficient.

The control unit can be designed to emit signals indicating whether the electric drive and/or the battery is in a state in which a boost can be carried out. It is possible to offer a boost in the boost mode which is damaging for the electric motor scooter over the long term. For example, the boost can have a damaging effect on the battery and/or the drive over a long period of time. It is possible for the battery to overheat due to fast discharging. To prevent the electric motor scooter from being damaged, the control unit can emit signals which allow such situations to be avoided. These signals may indicate whether a boost can be carried out or not.

Whether a boost can be carried out or not may be determined by means of parameters which are collected by the control unit. Parameters which come from the electric drive and/or the battery may be taken into consideration. In one embodiment, the following parameters are taken into consideration in the determination:
- period of time since the last boost; and/or
- duration of the last boost; and/or
- temperature values of the battery and/or the drive.

The period of time since the last boost and its duration can be determined by the control unit provided the control unit has control over the relevant procedure. Temperature values may be provided by the battery and/or the drive by means of an appropriate sensor. According to some aspects, it is also possible to estimate temperature values using models.

An appropriately designed control unit can help to determine a situation reliably in which a boost can be carried out without exposing the motor scooter to damage.

The control unit can be designed to emit signals which indicate over what period of time a/the boost is available. This period of time may be displayed on a display. According to some embodiments, the control unit can also be designed to quantify readiness to carry out a boost. A quantification can include the length of time the boost will be available. It is possible to indicate the period of time over which the boost is available in figures. It may be advantageous for the use of the motor scooter if the values are displayed by means of appropriate symbols. When the motor scooter is travelling on the road, symbols can be identified and classified more easily. In one embodiment, the period of time is displayed using bars or similar symbols. For example, several bars one on top of the other can form a column, which indicates how long a relevant boost is available. The length of the boost mode can also be displayed by means of the fill level of individual bars or of all the bars. It is also possible to display percentages, for example in the form of pie charts. When both bars and pie charts are displayed, in some embodiments, there may be a pre-set maximum length for requesting the boost. This maximum length can, for example, be less than or equal to 3 minutes or less than or equal to 2 minutes or less than or equal to 90 seconds.

In one embodiment, after the boost has been used, the period of time to a new or further use of the boost can be partially reduced or completely eliminated. In this situation, the period of time may build up again gradually and is displayed in an appropriate manner.

The electric scooter, in particular the actuation unit, can be designed such that:
- at least 10 percent, in particular at least 15 percent, of the total distance of actuation is assigned to the recuperation mode; and/or
- at least 5 percent, in particular at least 10 percent, of the total distance of actuation is assigned to the coasting mode; and/or
- at least 40 percent, in particular at least 50 percent, of the total distance of actuation is assigned to the acceleration mode; and/or
- at least 3 percent, in particular at least 5 percent, of the total distance of actuation is assigned to the boost mode.

This means, for example, that relatively long distances are available for the recuperation mode, which can be used to activate recuperation in a regulated way. As recuperation normally leads to the deceleration of the vehicle, gradual activation, such as over the distance assigned to the recuperation mode, can increase the safety of the vehicle. Furthermore, roll stopping distances, for instance at traffic lights, can be used particularly efficiently to recover energy for the battery.

In one embodiment, an electric scooter comprises a smartphone holder, the smartphone holder comprising:
- a foam container in which to place the smartphone; and
- a rotatably mounted, at least partially transparent, cover, which presses the smartphone against the foam container in a locked position.

The smartphone holder may efficiently hold a smartphone on the electric motor scooter, for example, on the steering unit thereof. The smartphone holder can also comprise an integrated display, which can be used by the control unit. For example, the symbols regarding the availability and the period of time of the boost mode or the boost can be displayed on the display. The smartphone holder can be regarded as a separate embodiment. In some embodiments, a smartphone holder may provide the housing for at least part of the described electronics for the control unit.

In one embodiment, a cover of a smartphone holder comprises an upper flat section and a lower flat section, the upper flat section protecting the integrated display and the lower flat section holding the smartphone. Both the lower and the upper flat sections can be designed to be at, least partially, transparent, so that the integrated display and/or the display of the smartphone can be read.

The smartphone holder may be designed in such a way that the integrated display and the smartphone lie in a position in which their surfaces are at an obtuse angle to each other. The sections of the cover can also be arranged at an obtuse angle to each other. The cover may have a relatively large surface, so that the smartphone is pressed against the phone with a certain handle.

In one embodiment, in an upper area of the upper section at least one bracket is provided for the rotational mounting of the cover on the smartphone holder. In the lower area of the lower section a snap-in locking device can also be provided to fix the cover. With this design, the smartphone can be inserted and removed easily.

Several embodiments are described in more detail below in connection with the Figures. In the Figures.

In the following description the same reference numerals are used for parts that are identical or have the same effect.

Figure 1:
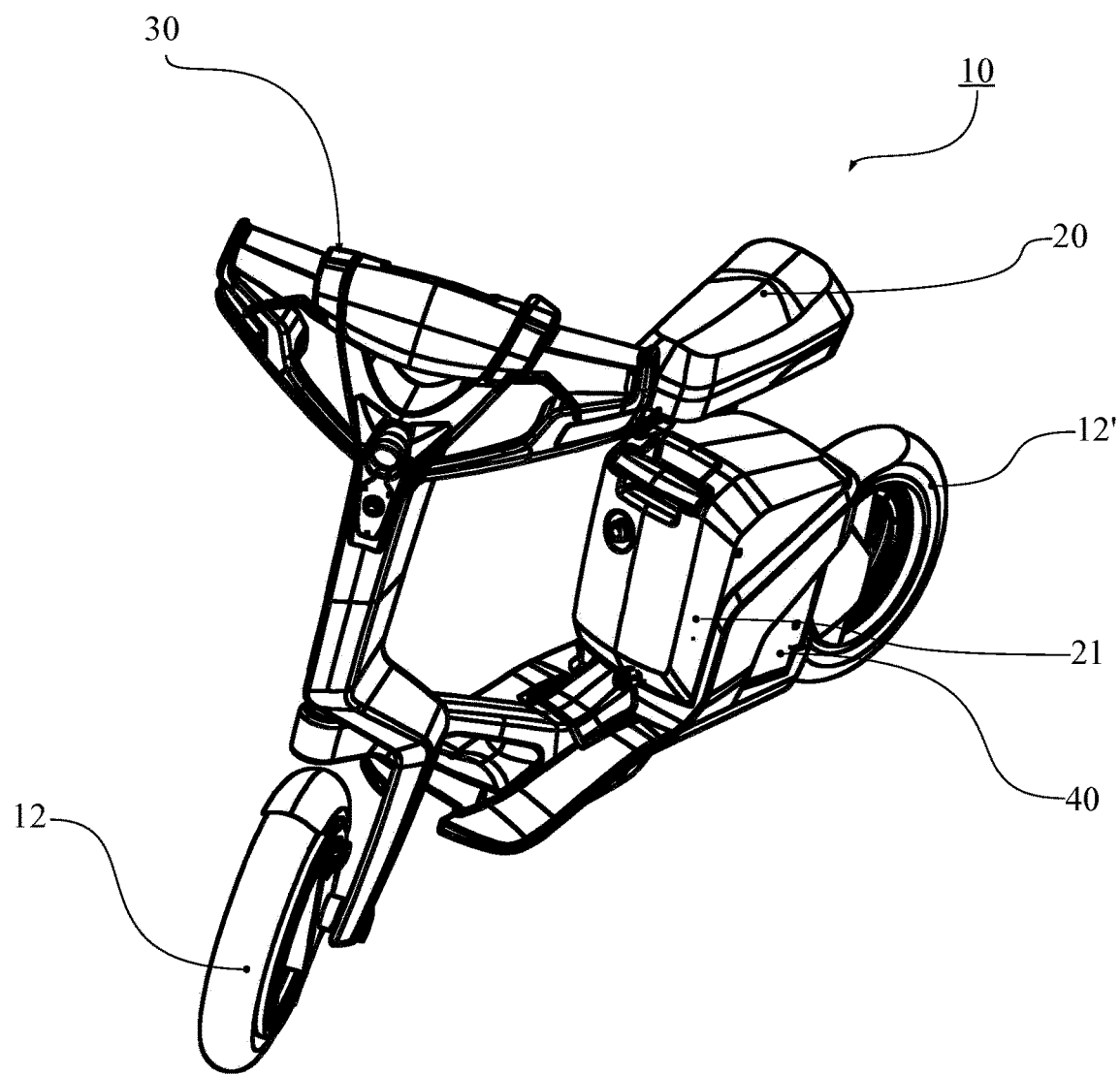
FIG. 1 shows an overall view of an electric motor scooter according to one embodiment with a steering unit for steering the motor scooter.

FIG. 1 shows an overall view of a scooter or motor scooter 10 according to one embodiment. The motor scooter 10 has a body to which a front wheel 12 and a rear wheel 12' are rotatably attached. The body also comprises a steering unit 30 for steering the motor scooter 10. The front wheel 12 is located at the lower end of the steering unit 30. In the back part of the body there is a battery box 21, to which a saddle 20 is connected.

Figure 2:
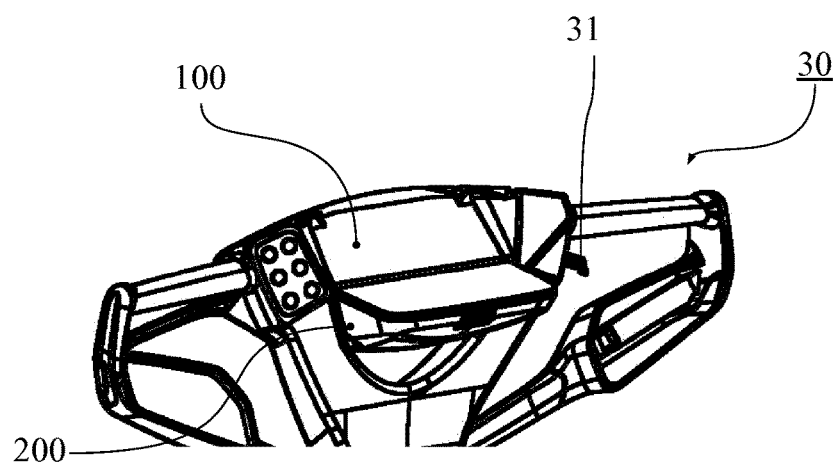
FIG. 2 shows a detailed view of the upper section of the steering unit with a display for displaying information and a thumb lever for specifying a driving mode.

The upper area of the steering unit 30 is in the shape of a T (see FIG. 2). Handle grips are arranged on the left-hand and right-hand sides of the steering column into which the brake lever (left-hand side) and a thumb lever 31 (right-hand side) protrude. At the end of the steering column in the upper area of the steering unit 30 there is a smartphone holder 200, into which a display 100 with a screen 110 (FIG. 8) is integrated.

Figure 7:
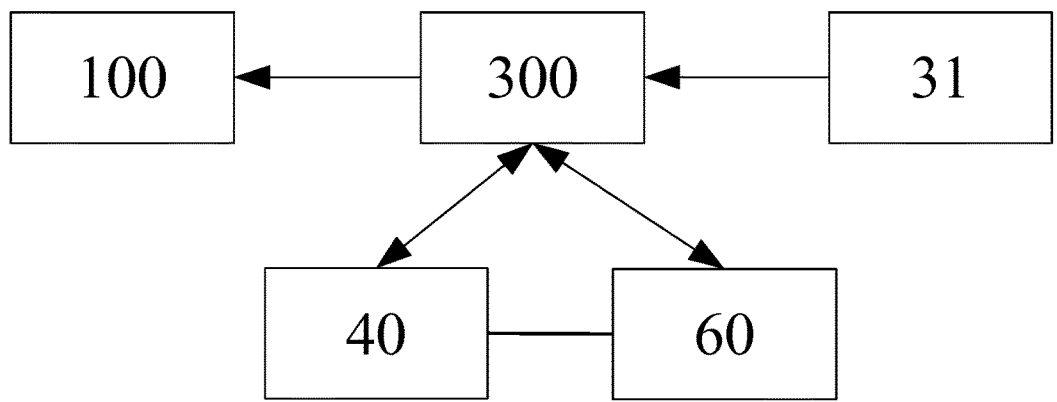
FIG. 7 shows individual components of the motor scooter from FIG. 1.

The motor scooter 10 includes a control unit 300 (FIG. 7), which communicates with the thumb lever 31 and with the display 100. The thumb lever 31 is equipped with an appropriate sensor, with the result that it can deliver signals to the control unit 300 about its position in relation to a starting position. For its part, the control unit 300 can emit signals which can be displayed on the screen 110 by means of the display 100.

The control unit 300 also communicates via a bus system with a battery 60, which is integrated into the battery box 71, and with a motor 40. The motor 40 and the battery 60 make up the drive of the motor scooter 10, at least when it is connected to the power source.

The control unit 300 controls the behaviour of the motor 40 and of the battery 60.

In an embodiment, the control unit 300 implements four different driving modes. These driving modes are as follows:
 a) a recuperation mode;
 b) a coasting mode;
 c) an acceleration mode; and
 d) a boost mode.

Figure 3:
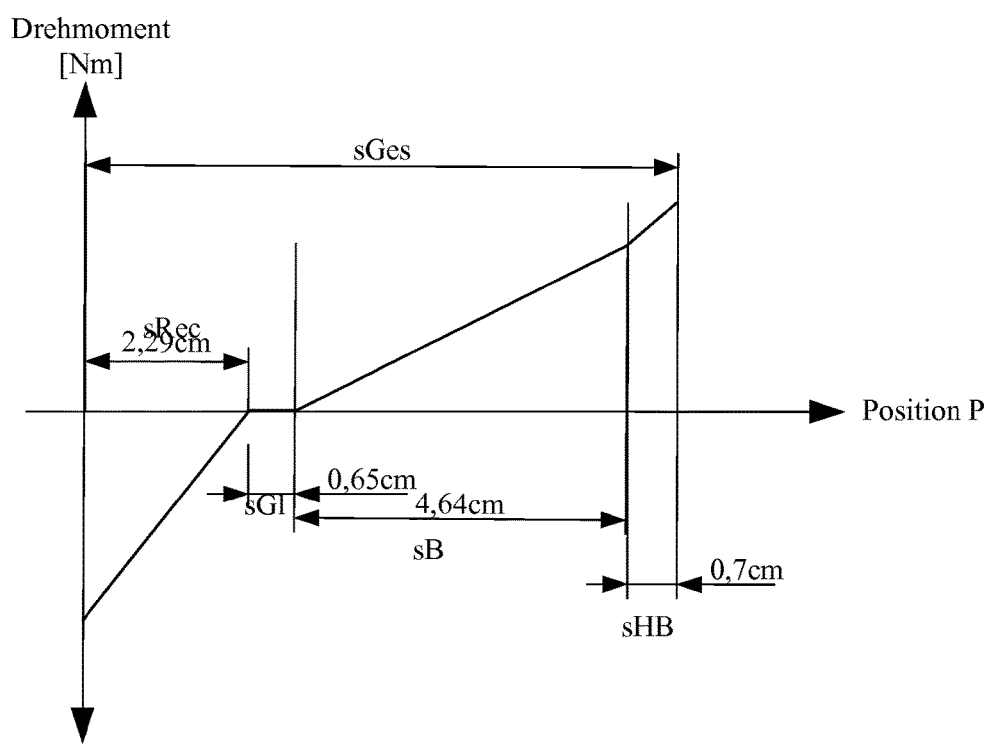
FIG. 3 shows a view of the driving modes with corresponding torques.

The individual driving modes are implemented in such a way that they provide torques, as shown in FIG. 3.

The axes of the graph in FIG. 3 designate a position P of the thumb lever 31 (x axis) and a torque (y axis), which is applied by the motor 40.

According to one embodiment, when not in use the thumb lever 31 is in the zero position. Then, distances follow for:
 a) the recuperation mode=sRec;
 b) the coasting mode=sGI;
 c) the acceleration mode=sB;
 d) the boost mode=sHB.

The thumb lever 31 is therefore in the starting position/rest position. First, it covers the distance sREC for recuperation, then the distance for the coasting mode sGI, then the distance for the acceleration mode sB and, finally, the distance for the boost mode sHB. The distances are broken down in the execution example as follows:
 sREC=20 percent;
 sGI=10 percent;
 sB=65 percent;
 sHB=10 percent
of a distance of actuation sGES.

When the motor scooter 10 travels, there is no resulting torque in the coasting mode, while, in the recuperation mode, a negative torque acts which may increase linearly with increasing distance from the coasting mode. In the acceleration mode, therefore, there is a positive torque, which also increases with increasing distance from the coasting mode. There may be a linear dependence between the distance and the torque. There is also a positive torque in the boost mode, which increases linearly with increasing distance from the acceleration mode. The acceleration mode and the boost mode may be implemented such that acceleration in the boost mode is much greater than in the acceleration mode.

According to some embodiments, the control unit 300 can be designed to emit signals indicating whether a boost mode is available. The availability of the boost mode may not be given if the battery 60 is low. For the purpose of determining whether a boost mode can be implemented without damaging the motor scooter 10, temperature conditions in or in the area of the battery 60 and/or in or in the area of the motor 40 can be taken into consideration. According to some aspects, one or more of the named criteria can be used to determine availability.

In one embodiment, the control unit 300 is designed such that it makes the availability of a boost mode dependent on when a boost mode was last requested and how long the vehicle was driven in boost mode.

Figure 4:
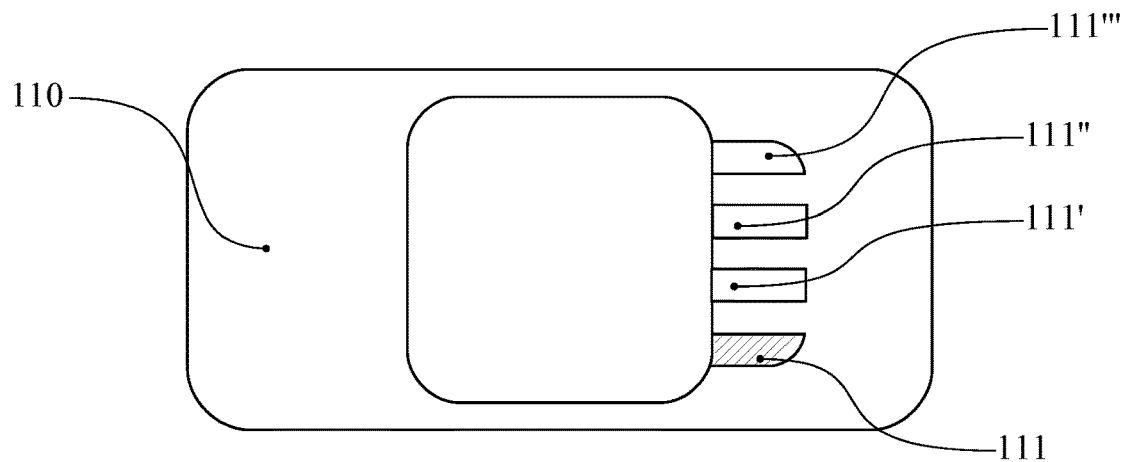
FIG. 4-6 show different screen displays, which show the availability status of a boost mode.
Figure 5:
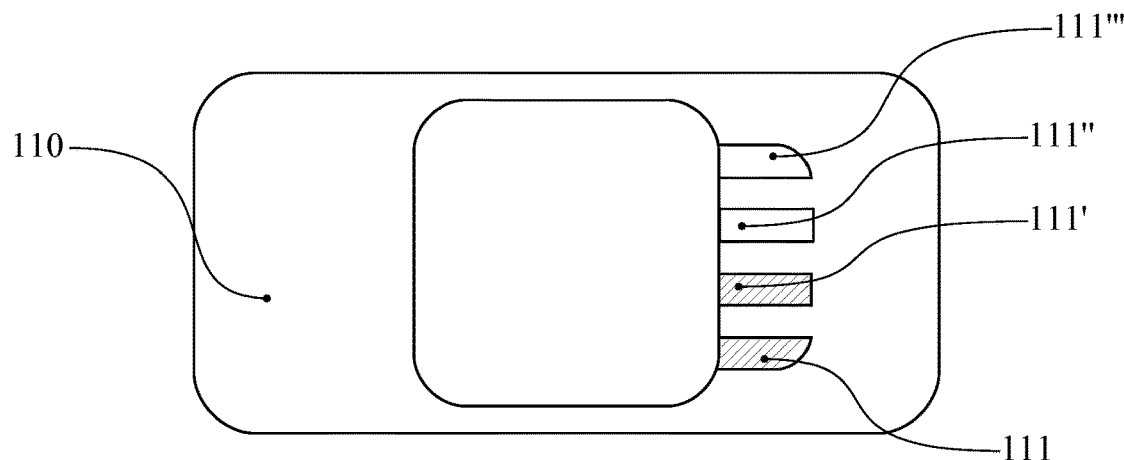
Figure 6:
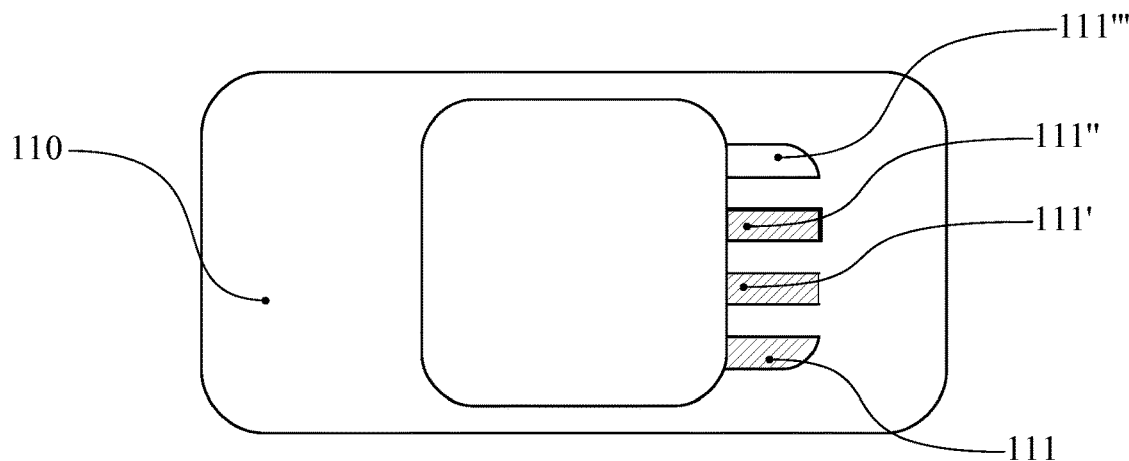

The control unit 300 also emits signals to indicate to the user how long he or she can drive with the boost. These signals are emitted via the display 100. FIGS. 4 to 6 show the screen 110 of the display 100 in different states. In each of the states shown, the screen 110 shows four charge bars 111, 111', 111", 111'". According to the state of the motor scooter 10, or, more accurately, the availability of the boost mode, the charge bars 111, 111', 111", 111'" are filled or simply outlined. If all charge bars 111, 111', 111", 111'" are filled, the boost mode is available for a maximum time interval (=maximum time), for example 1 minute. The control unit 300 controls the display 100 so that the layout of the screen 110 is different when availability is lower.

In FIG. 4 only the lowest charge bar 111 is filled. The remaining charge bars 111', 111", 111'" are empty. Ultimately, therefore, the control unit 300 indicates that the boost mode is available for just a quarter of the maximum time, for example 15 seconds.

In FIG. 5 the lowest charge bar 111 and the next charge bar above 111' are filled. The remaining charge bars 111", 111'" are empty. This means that the control unit 300 is signalling a state in which the boost mode is available for a time interval which is half the maximum time. The display according to FIG. 5 can therefore indicate that the boost mode is available for approximately 30 seconds. In FIG. 6 three charge bars 111, 111', 111" of the four charge bars 111, 111', 111", 111'" are filled. The result is, therefore, that the boost mode can be requested for three quarters of the maximum time.

In this embodiment, the control unit 300 is designed such that the availability of the boost mode can be slowly reduced when driving takes place in boost mode. For example, as soon as the aforementioned maximum time is reached, the available torque is reduced. When driving takes place in normal acceleration mode, or in recuperation mode, or in coasting mode, availability increases again, with the result that, after a certain time, it is possible to return to boost mode.

Figure 8:
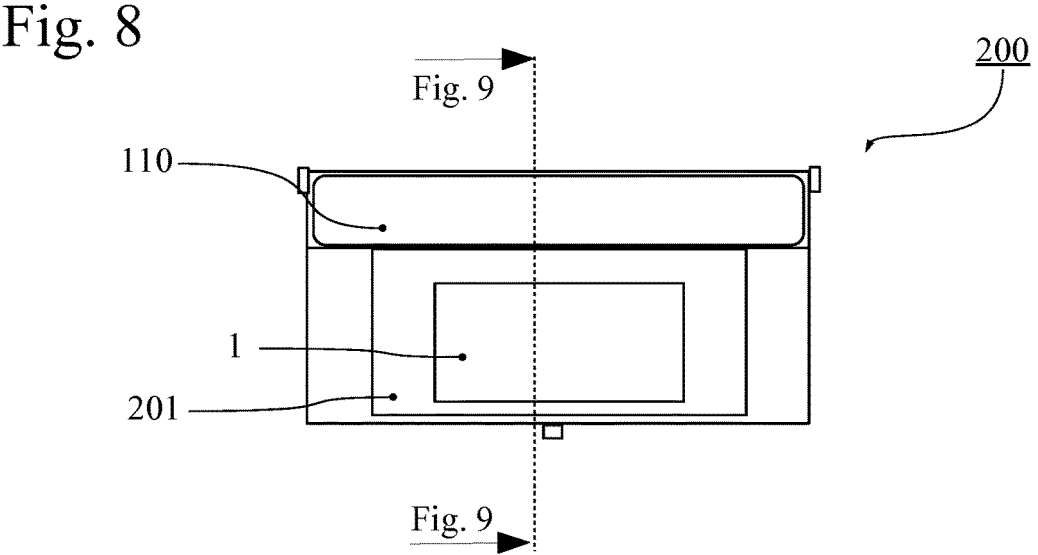
FIG. 8 shows a plan view of a smartphone holder integrated into the steering unit according to FIG. 1 and FIG. 2.
Figure 9:
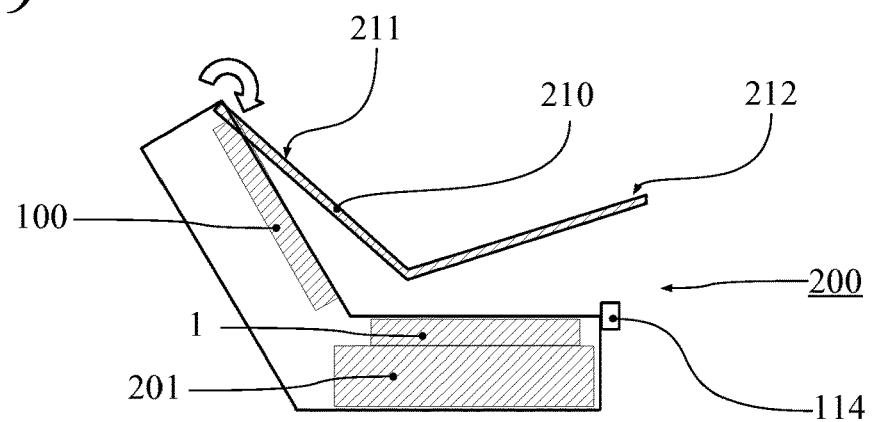
FIG. 9 shows a cross section through the smartphone holder from FIG. 8.

FIGS. 8 and 9 show details of the smartphone holder 200 from FIG. 2. The smartphone holder 200 comprises a display 100 with a screen 110 as well as a foam block 201, on which a smartphone 1 can be placed and fixed.

According to the cross section from FIG. 9 the smartphone holder 200 has two sections, which are arranged at an obtuse angle to each other. The display 100 is integrated into the upper section and the foam block 201 is integrated into the lower section. The smartphone holder 200 comprises a cover 210, which is rotatably mounted on the housing of the smartphone holder 200. The cover also comprises an upper cover section 211 and a lower cover section 212, which are effectively arranged at an obtuse angle to each other. The cover 210 makes it possible to open and close (e.g., lock) the smartphone holder 200. In one embodiment, the cover 210 is made of a transparent durable material, so that the screen 110 of the display 100 can be read in the closed state or in the locked position. Accordingly, the cover 110 also enables displays on the smartphone 1 to be recognised in the closed state. The foam block 201 and the housing, as well as the cover 210, of the smartphone holder are designed in such a way that, in the locked state, the smartphone 1 is clamped between the lower cover section 212 and the foam block 201. In this state, the smartphone 1 cannot therefore shift and is securely held. A snap-in locking device 214 provides a snap-lock connection for the cover 210 so that, in the closed state, the cover 210 is releasably held on the casing.

The techniques described herein may be implemented in numerous ways by the person skilled in the art, who is active in this area. In the foregoing description, a control unit 300 was described which controls the battery 60 and the motor 40. According to some embodiments, the control unit 300 can also be a regulating device which regulates some of the functions. In some applications, there may be no difference between controlling and regulating.

According to some aspects, the motor scooter 10 can also be equipped in such a way that it does not comprise a smartphone holder 200 as described in connection with FIGS. 8 and 9. For example, conventional displays 100 can be used that are suitable for displaying signals emitted by the control unit 300. It is also possible to use the smartphone holder 200 without the described control unit 300.

As regards the smartphone holder 200, it should also be noted that the arrangement of the swivel joint in the upper area of the housing of the smartphone holder 200 is not essential. For example, it is possible for the upper cover section 211 to be fixed to the housing and for just the lower cover section 212 to comprise the aforementioned rotary connection. In some instances, it is also possible to fix the smartphone 1 securely between the foam block 201 and the lower cover section 212.

The distances specified for the individual driving modes are also to be understood to be non-limiting examples. According to some aspects, these distances can be varied at will. In some embodiments, variations of these distances lie within a variation of no more than 50 percent, or no more than 30 percent of the individual distances.

LIST OF REFERENCE NUMERALS

1 Smartphone
10 Scooter
12 Front wheel
12' Rear wheel
20 Saddle
21 Battery box
30 Steering unit
31 Thumb lever
40 Motor or drive
60 Battery
100 Display
110 Screen
111, 111' 111", 111''' charge bars
200 Smartphone holder
201 Foam block
210 Cover
211 Upper cover section
212 Lower cover section
214 Snap-in locking device
300 Control unit
M Torque
P Position of the thumb lever
sGes Total distance of actuation
sRec Distance for the recuperation mode
sGl Distance for the coasting mode
sB Distance for the acceleration mode
sHB Distance for the boost mode

The invention claimed is:

1. An electric motor scooter comprising:
an electric drive operable in a plurality of drive modes;
an electric battery;
an actuation unit configured to be brought into one of a plurality of different positions along an actuation distance; and
a control unit, wherein the control unit is configured to determine a position of the actuation unit and select a drive mode from the plurality of drive modes depending on the position of the actuation unit, wherein the plurality of drive modes comprises a recuperation mode, a coasting mode, and an acceleration mode, wherein, when the recuperation mode is selected, the control unit is configured to control the electric drive so that energy generated in the electric drive is delivered, at least partially, to the battery, and wherein, when the coasting mode is selected, substantially no torque is applied by the electric drive.

2. The electric motor scooter of claim 1, wherein, when the acceleration mode is selected, the control unit controls the electric drive and/or the battery such that an essentially linear dependence exists between the position of the actuation unit along the actuation distance and a torque applied by the electric drive according to $M(P)=k1*P+d$, wherein $M(P)$ is the torque, $k1$ is a first acceleration coefficient, $P$ is the position of actuation unit, and $d$ is a constant.

3. The electric motor scooter of claim 2, wherein the plurality of driving modes comprises a boost mode, wherein, when the boost mode is selected, the control unit is configured to control the electric drive and/or the battery such that an essentially linear dependence exists between the position of the actuation unit along the actuation distance and the torque applied by the electric drive according to $M(P)=k2*P+d$, wherein $k2$ is a second acceleration coefficient that is larger than the first acceleration coefficient $k1$.

4. The electric motor scooter of claim 3, wherein the first acceleration coefficient is smaller than the second acceleration coefficient by at least 10 or 20 or 30 or 50 percent.

5. The electric motor scooter of claim 3, wherein the control unit emits a signal to indicate whether the electric drive and/or the battery are in a state in which the boost mode can be selected.

6. The electric motor scooter of claim 5, wherein the control unit is configured to determine if the boost mode can be selected based on at least one of a period of time since a previous boost, a duration of the previous boost and a temperature of the battery and/or the drive.

7. The electric motor scooter of claim 5, wherein the signal emitted by the control unit indicates a period of time that the boost mode is available, and wherein the period of time is indicated on a display.

8. The electric motor scooter of claim 7, wherein the control unit controls the display to display one or more symbols to indicate the period of time.

9. The electric motor scooter of claim 3, wherein at least 10 percent of the actuation distance is assigned to the recuperation mode, at least 5 percent of the actuation distance is assigned to the coasting mode, at least 40 percent of the actuation distance is assigned to the acceleration mode, and at least 3 percent the actuation distance is assigned to the boost mode.

10. The electric motor scooter of claim 1, further comprising a smartphone holder, the smartphone holder comprising:
a foam container to receive a smartphone; and
a rotatably mounted and at least partially transparent cover constructed and arranged to press the smartphone against the foam container in a locked position.

11. The electric motor scooter of claim 10, wherein the cover comprises an upper flat section to cover an integrated display and a lower flat section to hold the smartphone, and wherein the upper and lower sections are arranged at a an obtuse angle relative to each other.

12. The electric motor scooter of claim 11, further comprising:
   one or more brackets for the rotational mounting located at an upper area of the upper section; and
   a snap-in locking device in a lower area of the lower section to secure the cover.

13. An electric motor scooter comprising:
   an electric drive operable in a plurality of drive modes;
   an electric battery;
   an actuation unit configured to be brought into one of a plurality of different positions along an actuation distance; and
   a control unit, wherein the control unit is configured to determine a position of the actuation unit and select a drive mode from the plurality of drive modes depending on the position of the actuation unit, wherein the plurality of drive modes comprises a recuperation mode, a coasting mode, an acceleration mode, and a boost mode, wherein, when the recuperation mode is selected, the control unit is configured to control the electric drive so that energy generated in the electric drive is delivered, at least partially, to the battery, and wherein the control unit is configured to emit a signal to indicate whether the electric drive and/or the battery are in a state in which the boost mode can be selected.

\* \* \* \* \*